(12) United States Patent
Wisehart, Jr.

(10) Patent No.: US 10,997,181 B2
(45) Date of Patent: *May 4, 2021

(54) GENERATING A DATA STRUCTURE THAT MAPS TWO FILES

(71) Applicant: INTERNATIONAL BUSINESS MACHINES CORPORATION, Armonk, NY (US)

(72) Inventor: Thomas Charles Wisehart, Jr., Snellville, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,383

(22) Filed: May 12, 2020

(65) Prior Publication Data

US 2020/0272630 A1    Aug. 27, 2020

Related U.S. Application Data

(63) Continuation of application No. 15/689,100, filed on Aug. 29, 2017, now Pat. No. 10,685,025.

(51) Int. Cl.
*G06F 16/2455* (2019.01)
*G06F 40/149* (2020.01)
(Continued)

(52) U.S. Cl.
CPC ........ *G06F 16/24568* (2019.01); *G06F 16/38* (2019.01); *G06F 16/907* (2019.01); *G06F 40/149* (2020.01)

(58) Field of Classification Search
CPC .. G06F 16/24568; G06F 40/149; G06F 16/38; G06F 16/907; G06F 16/93;
(Continued)

(56) References Cited

U.S. PATENT DOCUMENTS 9,740,862 B1    8/2017  Quinlan
10,685,025 B2   6/2020  Wisehart, Jr.
(Continued)

FOREIGN PATENT DOCUMENTS

WO    2013138722 A1    9/2013
WO    2015150895 A1    10/2015

OTHER PUBLICATIONS

Wisehart, Jr., T.C., "Generating a Data Structure That Maps Two Files", U.S. Appl. No. 15/689,100, filed Aug. 29, 2017, 46 pages.

*Primary Examiner* — Robert W Beausoliel, Jr.
*Assistant Examiner* — Mohammad Solaiman-Bhuyan
(74) *Attorney, Agent, or Firm* — Cuenot, Forsythe & Kim, LLC

(57) ABSTRACT

A first file and a second file are retrieved from a database, in which the first and second files include an unstructured text stream. Metadata of the first and second files are extracted. The extracted metadata include a description category, entity source, geographic region, and a set of sub-files linked to the file. A data structure indicative of relationship between the first and second files is generated. Weighting factor is applied to the generated data structure, which indicates a degree of relationship between the first file and the second file. The relationship and the degree of the relationship are determined based on the extracted metadata of the first and second files. In response to a user requesting the first file, it is determined whether the second file should be provided in conjunction with the first file based on the weighting factor as applied to the data structure.

12 Claims, 7 Drawing Sheets

(51) Int. Cl.
*G06F 16/38* (2019.01)
*G06F 16/907* (2019.01)

(58) Field of Classification Search
CPC .. G06F 16/9024; G06F 16/901; G06F 16/908; G06F 16/13; G06F 16/14
See application file for complete search history.

(56) References Cited

U.S. PATENT DOCUMENTS

| | | |
|---|---|---|
| 2006/0235871 A1 | 10/2006 | Trainor |
| 2008/0040388 A1 | 2/2008 | Petri |
| 2011/0191320 A1 | 8/2011 | Glover |
| 2014/0019183 A1 | 1/2014 | Zeng |
| 2015/0234885 A1 | 8/2015 | Weinstein |
| 2015/0310031 A1 | 10/2015 | Kilpatrick |
| 2016/0019224 A1 | 1/2016 | Ahn |
| 2018/0143764 A1 | 5/2018 | Araki |
| 2019/0065554 A1 | 2/2019 | Wisehart, Jr. |

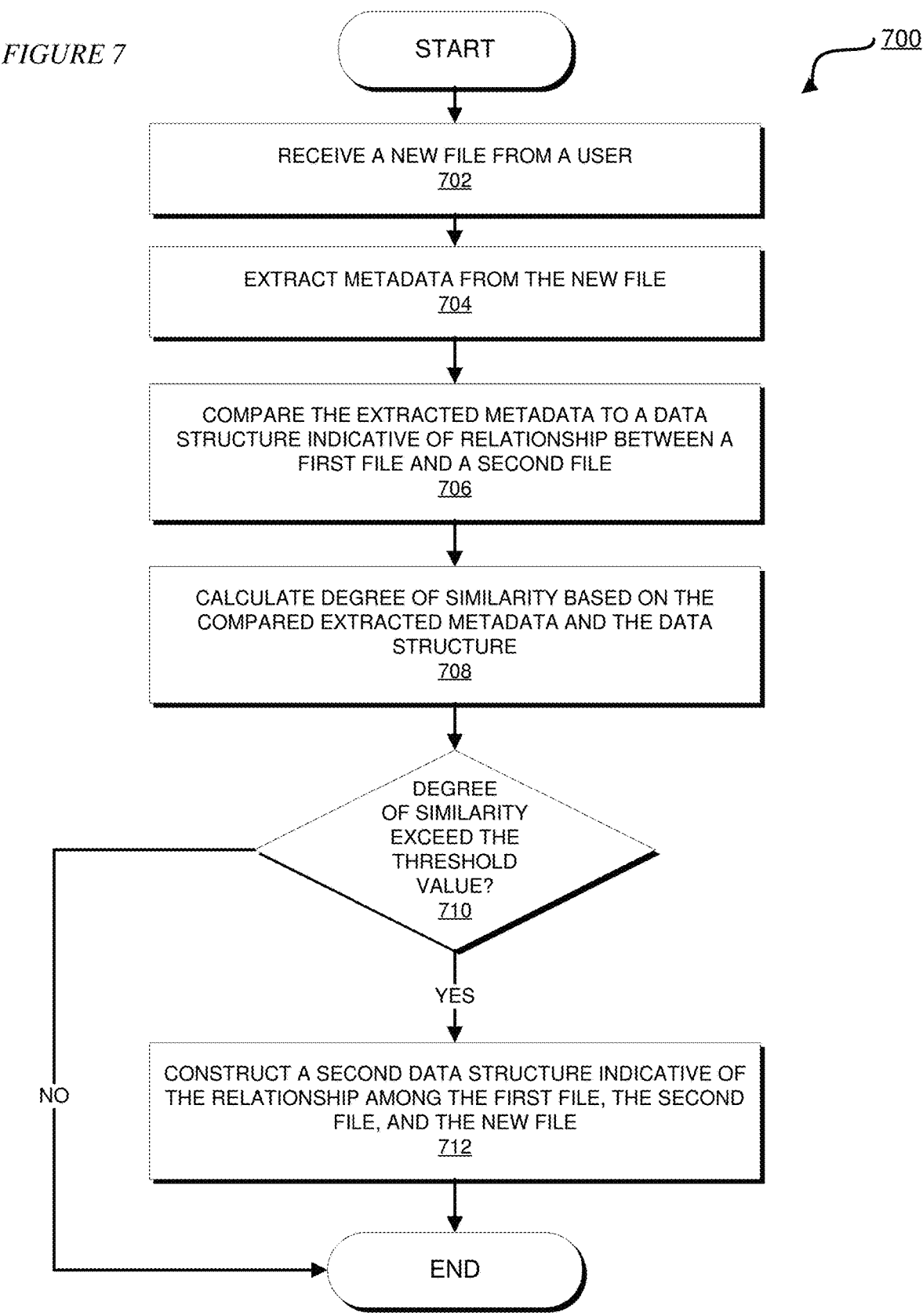

GENERATING A DATA STRUCTURE THAT MAPS TWO FILES

TECHNICAL FIELD

The present invention relates generally to a method, system, and computer program product for generating a data structure that maps two files. More particularly, the present invention relates to a method, system, and computer program product for generating a data structure that maps two files based on a degree of similarity of the metadata associated with the two files.

BACKGROUND

Generally, files can be categorized into structured or unstructured data. Current systems can efficiently process structured data, as such data is organized as columns and rows in a database which is easy to retrieve and process via a series of database queries and other programmable code. On the other hand, unstructured information is without any structure and/or schema which may cause significantly more processing time to parse such data. Further, analyzing unstructured data that has irregularities and ambiguities makes it significantly more difficult to understand using traditional programs as compared to structured data stored in fielded form in databases or annotated (semantically tagged) in documents.

Metadata can be utilized to analyze unstructured data, including parsing the metadata to identify provenance, description categories, and other information that describe the unstructured data. In other words, metadata provides additional information about a certain file's content. For example, an image file can be unstructured data includes a group of pixels that form the image, but may also include metadata that describes how large the picture is, the color depth, the image resolution, when the image was created, and other data. A text document's metadata may contain information about how long the document is, who the author is, when the document was written, and a short summary of the document. In several cases, the metadata may be captured as the file is created, or embedded by a user through various software tools such as RightField.

SUMMARY OF THE INVENTION

The illustrative embodiments provide a method, system, and computer program product. An aspect of the present invention retrieves a first file and a second file from a database, in which the first file and the second file include an unstructured text stream. The aspect of the present invention extracts metadata from the first file and the second file. In this aspect, the extracted metadata include a description category associated with a file, entity source that generated the file, geographic region to which the file is applicable, and a set of sub-files linked to the file. The aspect of the present invention generates a data structure indicative of relationship between the first file and the second file. The aspect of the present invention applies weighting factor to the generated data structure, in which the weighting factor is indicative of degree of relationship between the first file and the second file. In addition, the relationship and the degree of the relationship are determined based on the extracted metadata of the first file and the second file. In response to a user requesting the first file, it is determined whether the second file should be provided in conjunction with the first file based on the weighting factor as applied to the data structure.

An aspect of the present invention includes a computer program product. The computer program product includes one or more computer-readable storage devices, and program instructions stored on at least one of the one or more storage devices.

An aspect of the present invention includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts a flowchart of an example process for generating a data structure for multiple files in accordance with an illustrative embodiment.

DETAILED DESCRIPTION OF THE EMBODIMENTS

Figure 1:
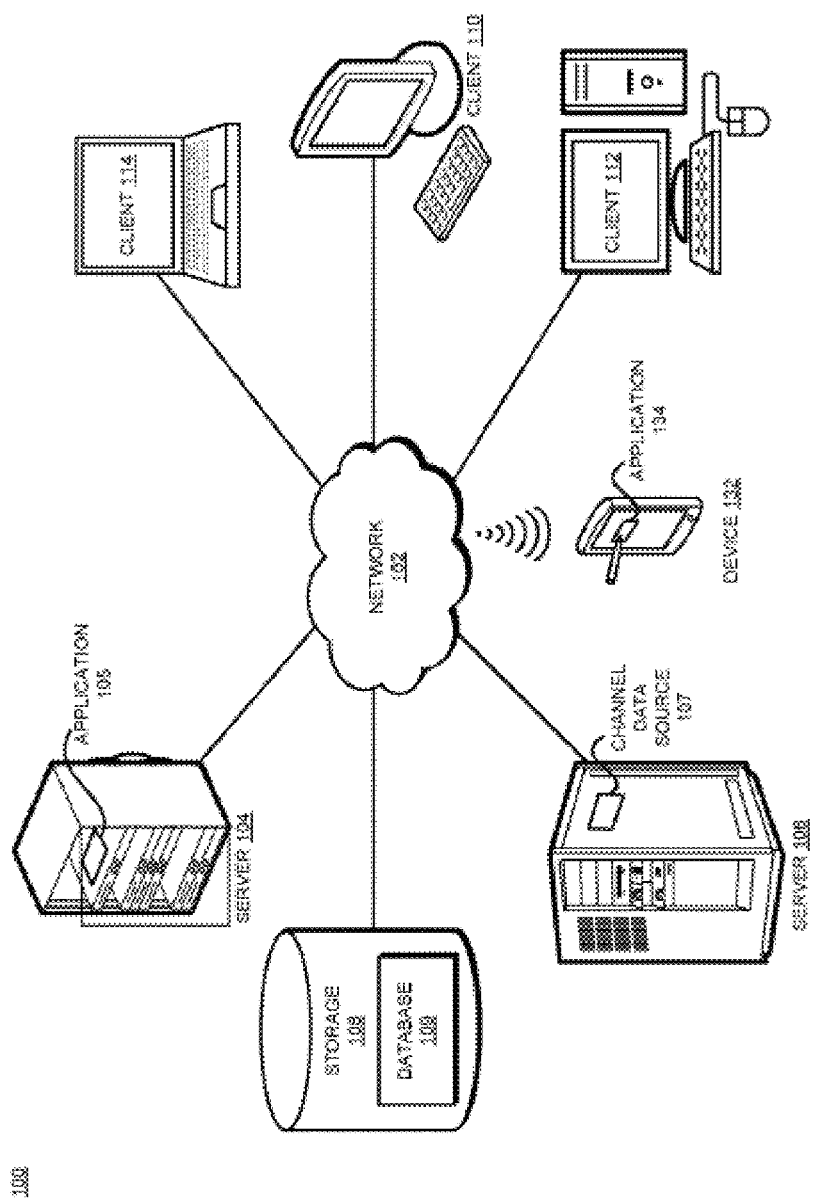
FIG. 1 depicts a block diagram of a network of data processing systems in which illustrative embodiments may be implemented.

We are currently experiencing explosive growth of information, especially when the information previously made available in the tangible format is rapidly transitioning into electronic formats. And in several cases, these electronic files are related to certain degrees. For example, a non-compliance of a statute subjecting an organization with sanctions may also cause collateral damage based on other sets of regulations that may have spawned from the statute or those that cited the statute. To remediate these types of issues, the illustrative embodiments recognize that each of these files may be manually annotated that it is related one or more other files. This manual approach, however, is very time consuming, and in view of the exponential rate of information growth, almost impossible to catch up.

The illustrative embodiments further recognize that a user may need to manually examine the contents of these files to determine how related these files are. As with the annotation issue, this approach impossible to catch up with the rate of information growth. This problem is even more pronounced in the area of government regulation, in which new statutes and regulation documents are being issued from government agencies all over the world. In this example, these statutes and regulation documents are almost always related to existing documents although the extent of the relationship between these documents is unknown unless or until a user manually examines these documents.

The illustrative embodiments further recognize that the currently available tools or solutions provide a functionality to catalog the files and annotate that certain sets of files are related. However, the process remains manually performed by the user except that such information is entered through the currently available tools or solutions. This may lead to inefficient processing, may be prone to human errors, and require duplicate efforts.

The illustrative embodiments recognize that the presently available tools or solutions do not address the needs or provide adequate solutions for these needs. The illustrative embodiments used to describe the invention generally address and solve the above-described problems and other problems related to establishing a network and relationship between files that may share a degree of similarities.

An embodiment can be implemented as a software application. The application implementing an embodiment can be configured as a modification of a data analytics platform, as a separate application that operates in conjunction with an existing data analytics platform, a standalone application, or some combinations thereof.

In one embodiment, files can be mapped through parsing of such files and extracting metadata therefrom. In this embodiment, the extracted metadata may include various categories, including description category, entity source, geographic region, and/or secondary set of files are associated with each of the files. For example, files can be regulatory documents, and the extracted metadata may state that the Federal Bureau of Investigation issued such documents, and the jurisdiction would span the United States region. The metadata of both files can be analyzed to determine whether a relationship exists between these two files, and, if so, the extent of the relationship between the two files. The results of the comparison may trigger generating a data structure that reflects such relationship and the strength of the relationship between two files. The degree of relationship can be assigned as a value that will be stored in the data structure, which would provide a complete record on how two files are mapped together. This allows the embodiment to determine, in response to a user request one file, whether another file should be provided by analyzing the data structure and any weighting factors that may denote the strength of the relationship between the two files.

In another embodiment, any files in a relationship as depicted by the data structure can be updated by a user. The embodiment may detect those updates in the files, then any values as noted in the data structure may be adjusted as well. In yet another embodiment, a new file can be added to a set of files that were previously linked by the data structure. In this embodiment, metadata is extracted from the new file, then is compared with the data structure that links the existing set of files. If the degree of similarity exceeds a threshold value, then a second data structure that links the new file and the set of files is created.

In one embodiment, the data structures mapping the two files may be exported into a summarized report, so as to allow the user to view and understand the relationships between the files in the database.

In some embodiments, the data structures may be utilized to determine a potential impact on an organization on several levels based on a single input. For example, a risk assessment report based on a first regulation may be submitted into a system. Once submitted, the embodiment pulls other files and/or documents that are regarded as related to the risk assessment report based on identifying and analyzing any available data structures that map the first regulation. In one embodiment, even when the data structure exists among the set of files, a user may filter which mapped files may be retrieved based on the strength of the relationship, e.g., evaluating the weight factors stored in the data structure. Based on the pulled files and/or documents, the embodiment may assess a complete overview of the impact that may be caused by non-compliance of the first regulation.

The illustrative embodiments are described with respect to certain types of files, metadata, data structures, weighting factors, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
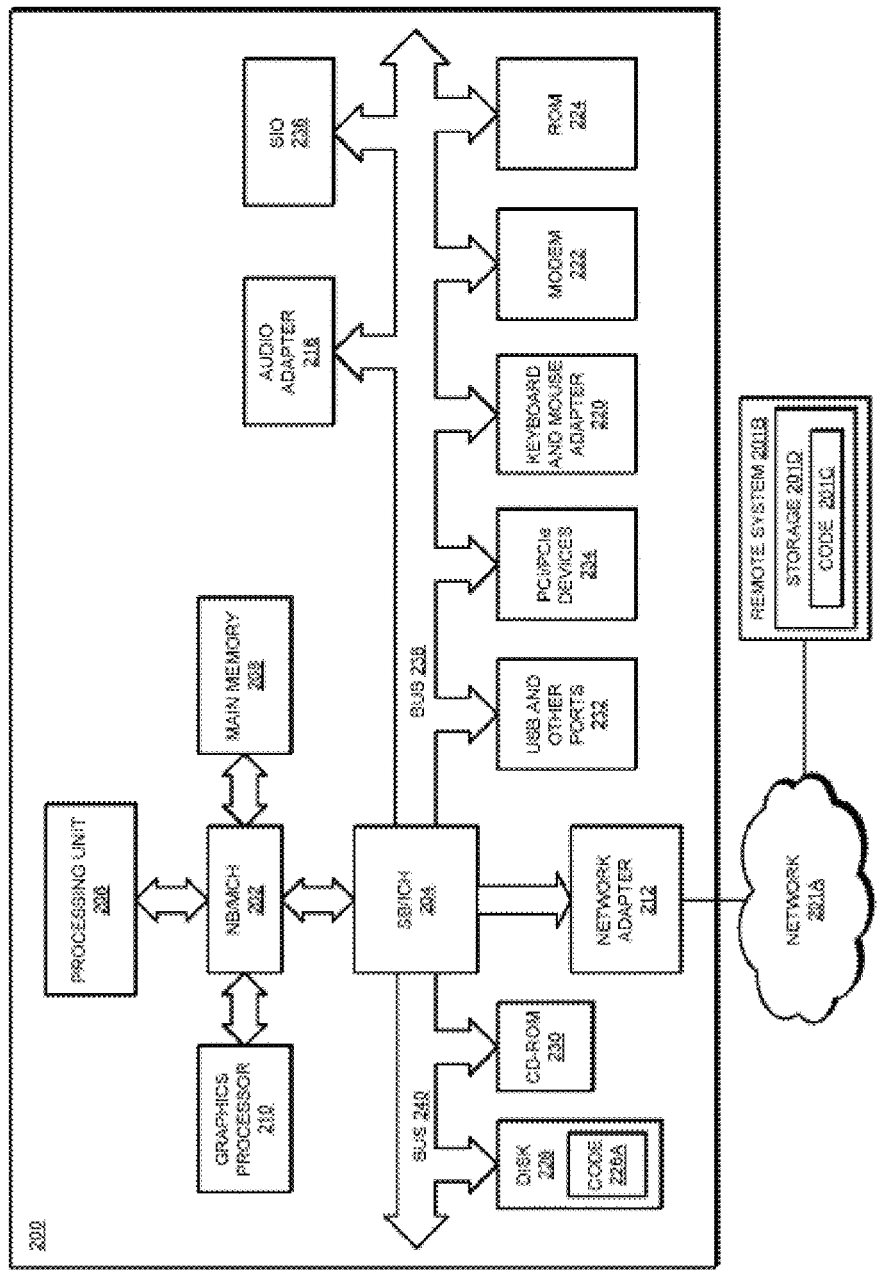
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 alone, application 134 alone, or applications 105 and 134 in combination implement an embodiment described herein. Channel data source 107 provides the past period data of the target channel or other channels in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD)

or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and/or application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
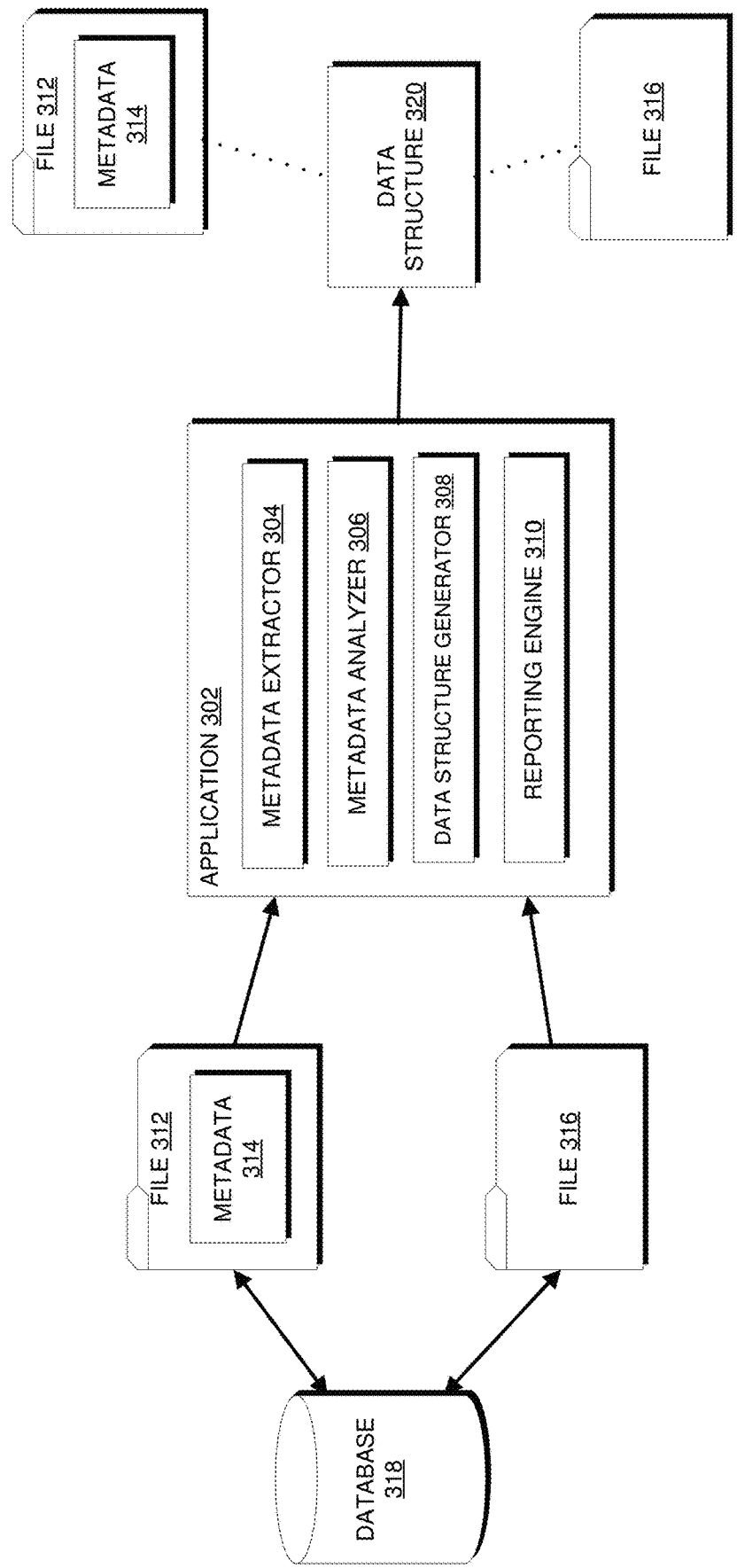
FIG. 3 depicts a block diagram of an example of generating a data structure between two files in accordance with an illustrative embodiment.

With reference to FIG. 3, this figure depicts a block diagram of generating a data structure between two files in accordance with an illustrative embodiment. Application 302 is an example of application 105 in FIG. 1. Database 318 is an example of database 109 in FIG. 1.

Files 312 and 316 may include an unstructured text or character stream. In one embodiment, file 312 may be formatted into several file container formats, such as Microsoft® Word document file format (e.g., .doc format) or WordPefect® file format (e.g., .wp format). In some embodiments, file 312 may be a stream of unstructured data represented as an HTML page in which contents can be assigned with a set of HTML tags such as <body>, or script tags such as <script>. In yet other embodiments, file 312 may include structured data, wherein the content may be formatted into a tabular format including rows and/or columns.

File 312 or any other files may include metadata 314. In one embodiment, metadata 314 may include a description category associated with a file, such as regulation category or anti-money laundering category. In another embodiment, metadata 314 may include a regulatory compliance category associated with a file, such as a regulatory guidance, regulatory action, or sanctions. In one embodiment, metadata 314 also includes an entity source that generated the file, including the regulatory organization that issued the content within the file. For example, the entity source can be the U.S. Securities Exchanges Commission, Financial Industry Regulatory Authority, or New York Investor Protection Bureau. In one embodiment, metadata 314 may also include geographic region to which the file, e.g., file 312, is applicable. In one embodiment, the geographic region from the metadata may be determined based on the description category of the file or the entity source already provided in the metadata. For example, the metadata may provide that the file includes a description category identifying that the file is a regulation and the entity source identifying that the file was issued by the New York Investor Protection Bureau. In this example, the geographic region to which the file is applicable would be New York, since the jurisdiction would only be effective in New York. In another example, the metadata may provide that the file includes an entity source that the file was issued by the U.S. Securities Exchanges Commission. In this case, the geographic region to which the file is applicable would be the United States, since the jurisdiction would only be effective in the United States.

Metadata 314 may also include a set of sub-files linked to the file. In one embodiment, the sub-files may be a set of documents related to file 312. For example, if file 312 is a regulation document issued by a government agency, the sub-files may be the statutes documents on which such regulation document is based. In another example, if file 312 is a regulation document issued by a government agency, the sub-files may be a second set of regulation-related documents which were cited in file 312. In one embodiment, the sub-files may be determined from a database based on keywords parsed via Natural Language Processing (NLP) performed on file 312. In another embodiment, the sub-files may be determined based on other categories already provided in metadata 314. In several embodiments, the set of sub-files may include set of documents related to files 312 and 314, including, but not limited to, federal regulations, statutes, obligation documents derived from the federal regulations, guidance documents derived from the federal regulations, or any combinations thereof.

Application 302 may reside in a server, such as servers 104 and 106 of FIG. 1, and includes metadata extractor 304, metadata analyzer 306, data structure generator 308, and reporting engine 310. In one embodiment, metadata extractor 304 retrieves files 312 and 316 and extracts any metadata that are associated with such respective files. For example, metadata extractor 304 may extract metadata 314 from file 312. In another embodiment, metadata extractor 304 may not be able to determine that a file includes any metadata, e.g., file 316. In such embodiment, metadata extractor 304 parses the content of those files through NLP to construct the metadata for file 316.

Metadata analyzer 306 evaluates the information provided by the metadata, e.g., metadata 314, of files 312 and 316, and determines a degree of relationship between files 312 and 316 based on the extracted metadata. In some embodiments, metadata analyzer 306 can determine the degree of the relationship based on a number of overlapping sub-files between the set of sub-files linked to the first file and the set of sub-files linked to the second file. In this embodiment, metadata analyzer 306 loops through each of the set of sub-files and applies keyword matching algorithm to the content of the sub-files in the first file and the content of the sub-files in the second file. Based on the number of keyword matches, metadata analyzer 306 assigns a value indicative of the degree of the relationship. For example, the degree of the relationship between the first file and the second file in which there are three regulation and one statute sub-files that overlap (as identified in the extracted metadata) will have a higher value than the degree of the relationship between a third file and a fourth file in which there are only two guidance documents that overlap.

In some embodiments, metadata analyzer 306 can determine the degree of the relationship based on a degree of similarity between the description category associated with the first file and the description category associated with the second file. In other embodiments, metadata analyzer 306 can determine the degree of the relationship based on a degree of similarity between the entity source of the first file and the entity source of the second file. In yet other embodiments, metadata analyzer 306 can determine the degree of the relationship based on a value representative of an overlap between the geographic region to which the first file is applicable and the geographic region to which the second file is applicable.

Data structure generator 308 generates data structure 320 indicative of the relationship between the files 314 and 316. In some embodiments, data structure generator 308 can additionally generate a weighting factor then assigns the weighting factor to the data structure. In this embodiment, the weighting factor indicates the degree of relationship between the first file and the second file as determined by metadata analyzer 306.

In one embodiment, data structure 320 may be a map or an array (one or multi-dimensional) that identifies the first file, the second file, respective metadata information, and the weighting factor. In another embodiment, data structure 320 may be a database record (e.g., SQL, NoSQL) that provides similar information: the first file, the second file, respective metadata information, and the weighting factor. In yet another embodiment, data structure 320 can be a linked list data structure which includes a pointer variable towards file 312, a second pointer variable towards file 316, and a third variable storing the weighting factor. In yet another embodiment, data structure 320 can be graph in which files 312 and 316 will be represented as nodes and the weighting factor will be represented as the edge, in which the edge may have different representations based on the generated weighting factor. In several embodiments, data structure 320 can include a series of variables that provide that a relationship exists between two files (e.g., files 312 and 316) and that the relationship can be strong or weak based on the association between the two files (e.g., weighting factor). In some embodiments, data structure 320 generated by data structure generator 308 may be stored in a database, such as database 318 or other databases (not shown).

Reporting engine 310 retrieves data structure 320 and any other data structures that were previously generated then outputs the retrieved data structure(s) to a user, including clients 110, 112, and 114 in FIG. 1. In one embodiment, reporting engine 310 may generate a report summarizing data structure 320 and any other data structures that were previously generated. In another embodiment, reporting engine 310 may export the data structures as cross-platform ingestible formats to allow them to be utilized by other applications or stored in other databases.

Database 318 may be implemented through a relational database in which the records are organized into a tabular format, having rows and columns in which the corresponding information can be stored in a "structured" format. Examples of a relational database include SQL and IBM® DB2®. The records stored in a relational database can be retrieved by executing a query constructed through user input.

In other embodiments, database 318 may be a non-relational database such as NoSQL. A NoSQL database environment is a non-relational and largely distributed database system that enables rapid, ad-hoc organization and analysis of extremely high-volume, disparate data types. NoSQL databases are sometimes referred to as cloud databases, non-relational databases, Big Data databases and a myriad of other terms and were developed in response to the sheer volume of data being generated, stored and analyzed by modern users (user-generated data) and their applications (machine-generated data).

In general, NoSQL databases have become the first alternative to relational databases, with scalability, availability, and fault tolerance being key deciding factors. They go well beyond the more widely understood legacy, relational databases (such as Oracle, SQL Server, and DB2 databases) in satisfying the needs of today's modern business applications. A very flexible and schema-less data model, horizontal scalability, distributed architectures, and the use of languages and interfaces that are "not only" SQL typically characterize this technology. Contrary to misconceptions caused by its name, NoSQL does not prohibit structured query language (SQL). While it's true that some NoSQL systems are entirely non-relational, others simply avoid selected relational functionality such as fixed table schemas and join operations. For example, instead of using tables, a NoSQL database might organize data into objects, key/value pairs or tuples.

There are four general types of NoSQL databases, each with their own specific attributes:

Graph database—Based on graph theory, these databases are designed for data whose relations are well represented as a graph and has elements which are interconnected, with an undetermined number of relations between them. Examples include Neo4j and Titan.

Key-Value store—we start with this type of database because these are some of the least complex NoSQL options. These databases are designed for storing data in a schema-less way. In a key-value store, all of the data within consists of an indexed key and a value, hence the name. Examples of this type of database include Cassandra, DyanmoDB, Azure Table Storage (ATS), Riak, BerkeleyDB.

Column store—(also known as wide-column stores) instead of storing data in rows, these databases are designed for storing data tables as sections of columns of data, rather than as rows of data. While this simple description sounds like the inverse of a standard database, wide-column stores offer very high performance and a highly scalable architecture. Examples include HBase, BigTable, and HyperTable.

Document database—expands on the basic idea of key-value stores where "documents" contain more complex in that they contain data and each document is assigned a unique key, which is used to retrieve the document. These are designed for storing, retrieving, and managing document-oriented information, also known as semi-structured data. Examples include MongoDB and CouchDB.

Figure 4:
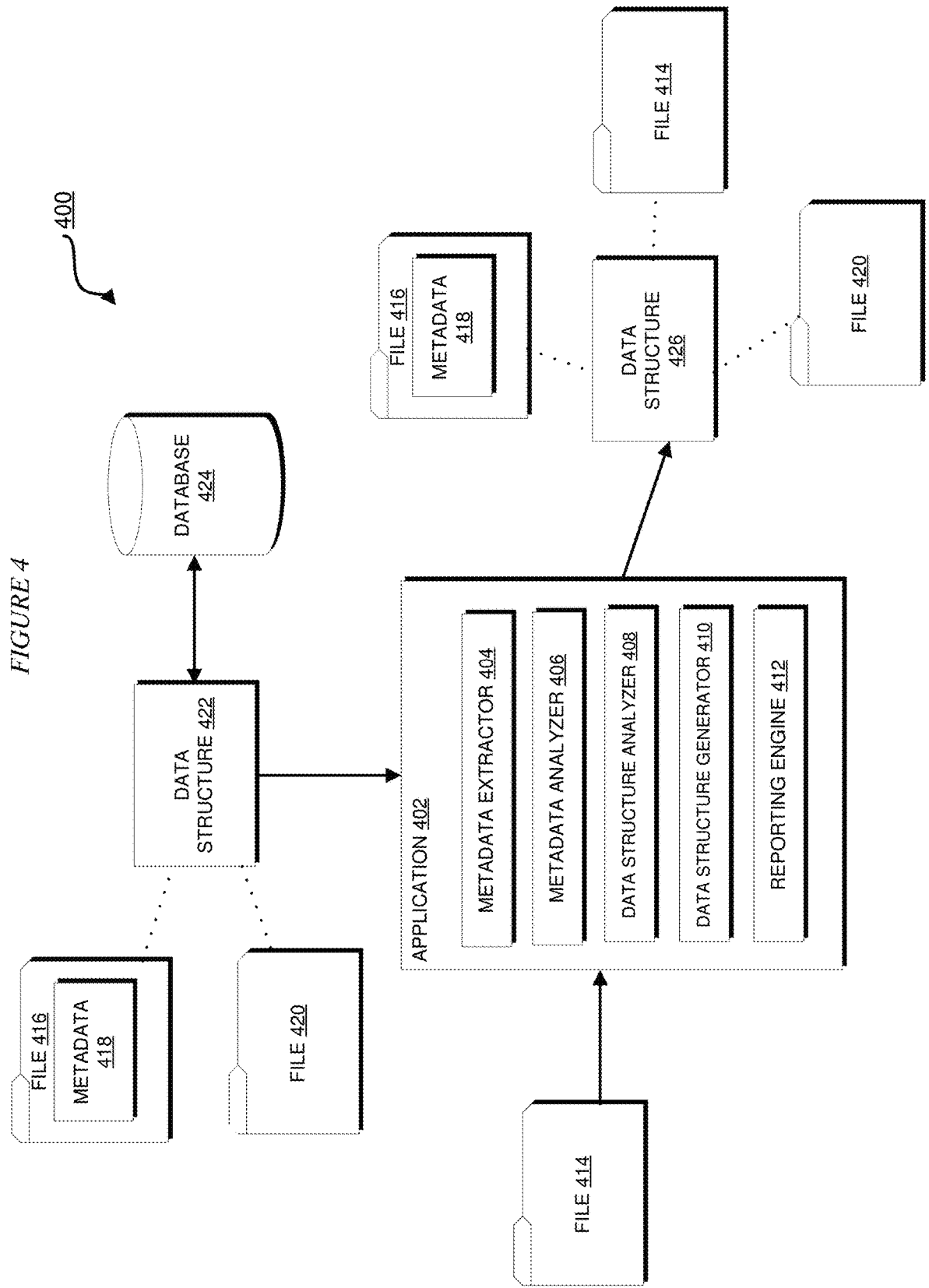
FIG. 4 depicts a block diagram of an example of updating a data structure between two files in accordance with an illustrative embodiment.

With reference to FIG. 4, this figure depicts a block diagram of updating a data structure between two files in accordance with an illustrative embodiment. Application 402 is an example of application 105 in FIG. 1 and application 302 in FIG. 3. Database 424 is an example of database 109 in FIG. 1 and database 318 in FIG. 3.

File 414 may include an unstructured text or character stream, and is an example of files 312 and 316 in FIG. 3. Files 416 and 420 are also examples of files 312 and 316 in FIG. 3. Metadata 418 is an example of metadata 314. Data structure 422 is an example of data structure 320 in FIG. 3.

Application 402 may reside in a server, such as servers 104 and 106 of FIG. 1, and includes metadata extractor 404, metadata analyzer 406, data structure analyzer 408, data structure generator 410, and reporting engine 412. Metadata extractor 404 is an example of metadata extractor 304 in FIG. 3. Metadata analyzer 406 is an example of metadata analyzer 306 in FIG. 3. Data structure generator 410 is an example of data structure generator 308 in FIG. 3. Reporting engine 412 is an example of reporting engine 310 in FIG. 3.

In one embodiment, metadata extractor 404 retrieves a new file, i.e., file 414, and may extract metadata from such file. If file 414 is a raw file that does not include any metadata, metadata extractor 404 constructs metadata based on parsing the contents in file 414 through NLP. Metadata analyzer 406 evaluates the information provided by the metadata of file 414.

Data structure analyzer 408 retrieves data structure 422 from database 424, then compares the metadata of file 414 with data structure 422. In this embodiment, data structure 422 links files 416 and 420 and may store any extracted metadata from such files. In one embodiment, data structure analyzer 408 retrieves the extracted metadata record from data structure 422, and compare the record with the metadata from file 414. In one embodiment, data structure analyzer 408 determines a degree of similarity between the metadata of file 414 and data structure 422, and whether the determined degree of similarity exceeds a threshold value.

If data structure analyzer 408 determines that the degree of similarity between the metadata of file 414 and data structure 422 and whether the determined degree of similarity exceeds a threshold value, data structure generator 410 generates a second data structure, i.e., data structure 426, that indicates the relationship among files 414, 416, and 420. Data structure 426 include its own weighting factor which provides the degree of relationship among files 414, 416, and 420. In one embodiment, data structure generator 410 may retain data structure 422. In another embodiment, data structure generator 410 may delete data structure 422.

Figure 5:
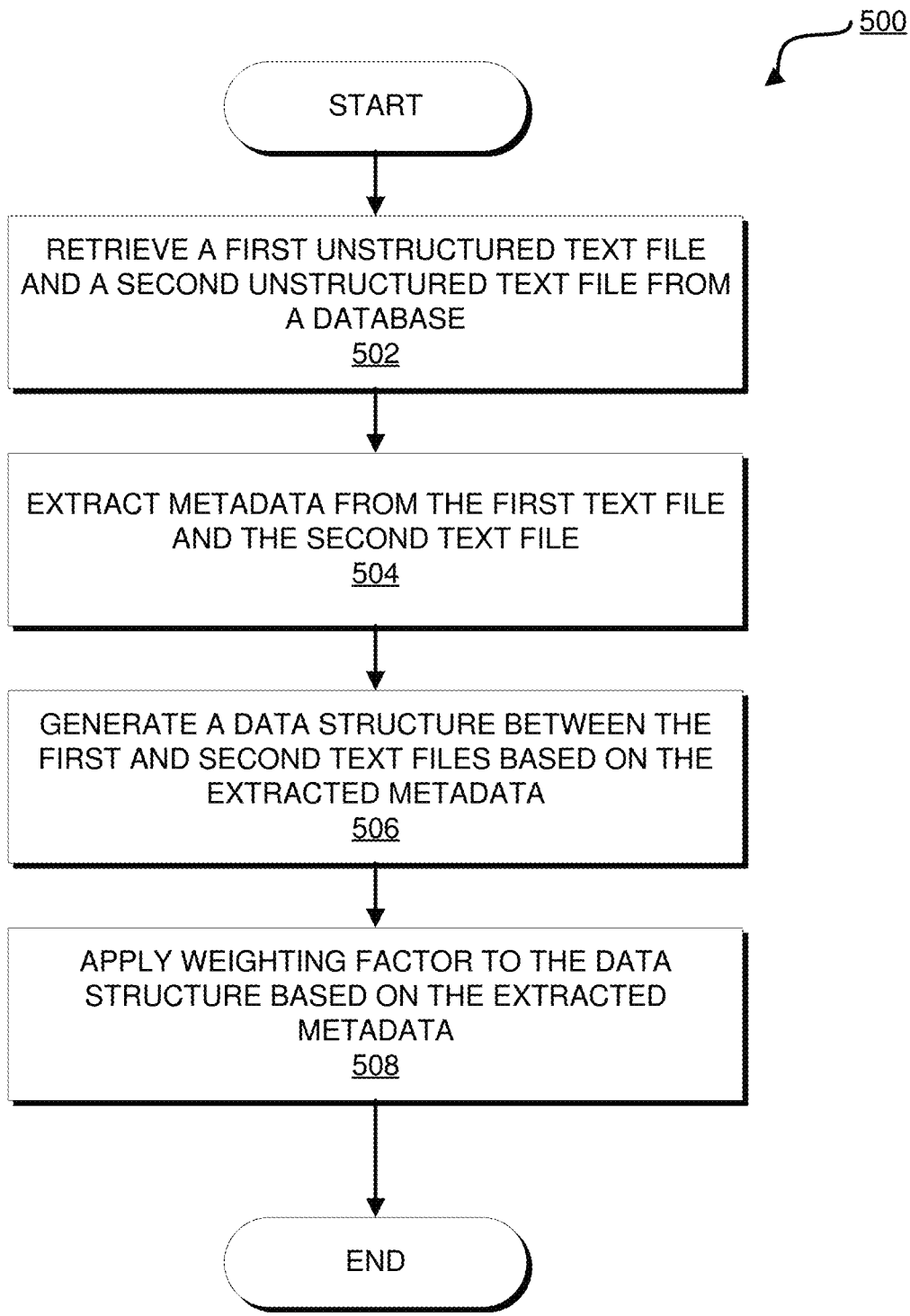
FIG. 5 depicts a flowchart of an example process for generating a data structure between two files in accordance with an illustrative embodiment.

With reference to FIG. 5, this figure depicts a flowchart of an example process for generating a data structure between two files in accordance with an illustrative embodiment. Process 500 may be implemented in application 302 in FIG. 3 or application 402 in FIG. 4.

The application retrieves a first unstructured text file and a second unstructured text file from a database (block 502). In one embodiment, the text files may be files 312 and 316 in FIG. 3 or files 414, 416, and 420 in FIG. 4. In one embodiment, the database may be database 318 FIG. 3 or database 424 in FIG. 4. The application extracts metadata from the first text file and the second text file (block 504). In one embodiment, the extracted metadata from block 504 may be metadata 314 from FIG. 3 or metadata 418 from FIG. 4. The application generates a data structure between the first and second text files based on the extracted metadata (block 506). In one embodiment, the data structure may be data structure 320 in FIG. 3 or data structure 422 in FIG. 4. The application applies weighting factor to the data structure based on the extracted metadata (block 508). Process 500 terminates thereafter.

Figure 6:
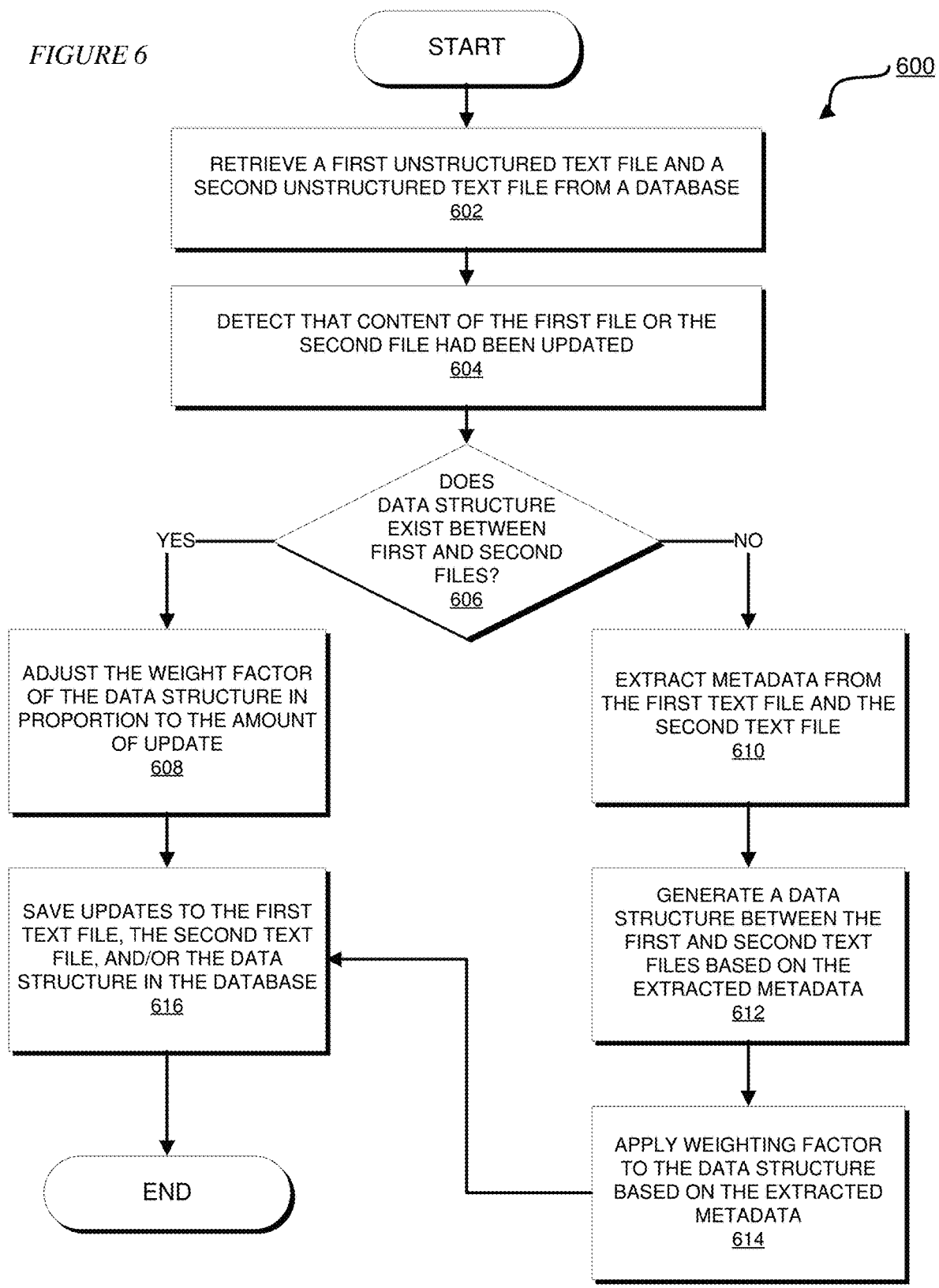
FIG. 6 depicts a flowchart of an example process for updating a data structure between two files in accordance with an illustrative embodiment.

With reference to FIG. 6, this figure depicts a flowchart of an example process for updating a data structure between two files in accordance with an illustrative embodiment. Process 600 may be implemented in application 302 in FIG. 3 or application 402 in FIG. 4.

The application retrieves a first unstructured text file and a second unstructured text file from a database (block 602). In one embodiment, the text files may be files 312 and 316 in FIG. 3 or files 414, 416, and 420 in FIG. 4. In one embodiment, the database may be database 318 FIG. 3 or database 424 in FIG. 4. The application detects that content of the first file or the second file had been updated (block 604). The application determines whether a data structure exists between the first and second files (block 606). In one embodiment, the data structure may be data structure 320 in FIG. 3 or data structure 422 in FIG. 4.

If a data structure exists between the first and second files ("Yes" path from block 606), the application adjusts the weight factor of the data structure in proportion to the amount of update (block 608).

If a data structure does not exist between the first and second files ("No" path from block 606), the application extracts metadata from the first and second files (block 610), generates a data structure between the first and second text files based on the extracted metadata (block 612), and applies weighting factor to the data structure based on the extracted metadata (block 614). In one embodiment, the extracted metadata from block 504 may be metadata 314 from FIG. 3 or metadata 418 from FIG. 4. For either path from block 606, the application saves updates to the first text, the second text file, and/or the data structure in the database (block 616). Process 600 terminates thereafter.

With reference to FIG. 7, this figure depicts a flowchart of an example process for generating a data structure for multiple files in accordance with an illustrative embodiment. Process 500 may be implemented in application 302 in FIG. 3 or application 402 in FIG. 4.

The application receives a new file from a user (block 702). In one embodiment, the new file may be file 414 in FIG. 4. In some embodiments, the application may receive the new file from the user who initially stored the file in the database. In other embodiments, the application may receive the new file from the user directly from the client device, such as clients 110, 112, and 114 in FIG. 1, via a telecommunications network, such as network 102 in FIG. 1. The application extracts metadata from the new file (block 704). In one embodiment, the extracted metadata from block 504 may be metadata 314 from FIG. 3 or metadata 418 from FIG. 4. The application compares the extracted metadata to a data structure indicative of relationship between a first file and a second file (block 706). In one embodiment, the data structure indicative of relationship between a first file and a second file may be data structure 320 in FIG. 3 or data structure 422 in FIG. 4.

The application calculates a degree of similarity based on the compared extracted metadata and the data structure (block 708). The application determines whether the calculated degree of similarity exceeds a threshold value (block 710). In one embodiment, the threshold value may be pre-configured by a user. In other embodiments, the threshold value may be calculated based on the weighting factor associated with the data structure between the first and second files.

If the application determines that the degree of similarity exceeds the threshold value ("Yes" path of block 710), the application constructs a second data structure indicative of the relationship among the first file, the second file, and the new file (block 712). In one embodiment, the second data structure may be data structure 426 in FIG. 4. In some embodiment, the application may delete the data structure between the first and second files. In other embodiments, the application may retain the data structure and the second data structure together. Process 700 terminates thereafter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
    receiving a new file from a user;
    extracting metadata from the new file;
    comparing the extracted metadata of the new file to a first data structure indicative of a relationship between a first file and a second file; and
    generating, responsive to a determination that a degree of similarity between the extracted metadata of the new file and the first data structure exceeds a threshold value, a second data structure indicating a relationship among the first file, the second file, and the new file.

2. The method of claim 1, wherein
the extracted metadata includes:
    a description category associated with the new file,
    an entity source that generated the new file,
    a geographic region to which the new file is applicable, and
    a set of sub-files linked to the new file.

3. The method of claim 1, wherein
the first data structure:
    (i) is derived based on metadata of the first file and the second file, and
    (ii) includes a weighting factor indicative of a degree of relationship between the first file and the second file.

4. The method of claim 1, wherein
the second data structure includes:
    a second weighting factor indicative of a degree of relationship among the first file, the second file, and the new file.

5. A computer hardware system, comprising:
    a hardware processor configured to perform the following executable operations:
    receiving a new file from a user;
    extracting metadata from the new file;
    comparing the extracted metadata of the new file to a first data structure indicative of a relationship between a first file and a second file; and
    generating, responsive to a determination that a degree of similarity between the extracted metadata of the new file and the first data structure exceeds a threshold value, a second data structure indicating a relationship among the first file, the second file, and the new file.

6. The system of claim 5, wherein
the extracted metadata includes:
    a description category associated with the new file,
    an entity source that generated the new file,
    a geographic region to which the new file is applicable, and
    a set of sub-files linked to the new file.

7. The system of claim 5, wherein
the first data structure:
    (i) is derived based on metadata of the first file and the second file, and
    (ii) includes a weighting factor indicative of a degree of relationship between the first file and the second file.

8. The system of claim 5, wherein
the second data structure includes:
    a second weighting factor indicative of a degree of relationship among the first file, the second file, and the new file.

9. A computer program product, comprising:
    a computer readable storage medium having program instructions stored thereon,
    the program instructions are executable by a computer hardware system to cause the computer hardware system to perform:
    receiving a new file from a user;
    extracting metadata from the new file;
    comparing the extracted metadata of the new file to a first data structure indicative of a relationship between a first file and a second file; and
    generating, responsive to a determination that a degree of similarity between the extracted metadata of the new file and the first data structure exceeds a threshold value, a second data structure indicating a relationship among the first file, the second file, and the new file.

10. The computer program product of claim 9, wherein the extracted metadata includes:
   a description category associated with the new file,
   an entity source that generated the new file,
   a geographic region to which the new file is applicable, and
   a set of sub-files linked to the new file.

11. The computer program product of claim 9, wherein the first data structure:
   (i) is derived based on metadata of the first file and the second file, and
   (ii) includes a weighting factor indicative of a degree of relationship between the first file and the second file.

12. The computer program product of claim 9, wherein the second data structure includes:
   a second weighting factor indicative of a degree of relationship among the first file, the second file, and the new file.

\* \* \* \* \*